April 19, 1966     L. N. MERTZ ET AL     3,246,557
DISPERSIVE SPECTROMETRIC MODULATION SIMULATING INTERFEROMETRY
Filed Oct. 24, 1961     2 Sheets-Sheet 1
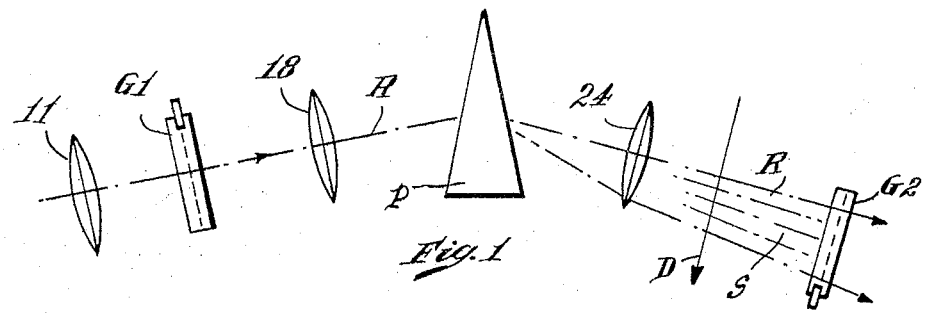
Fig. 1
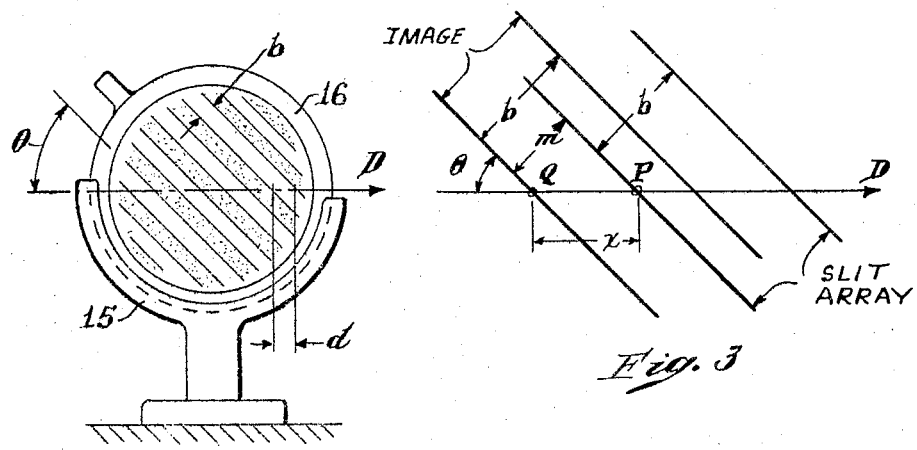
Fig. 2
Fig. 3
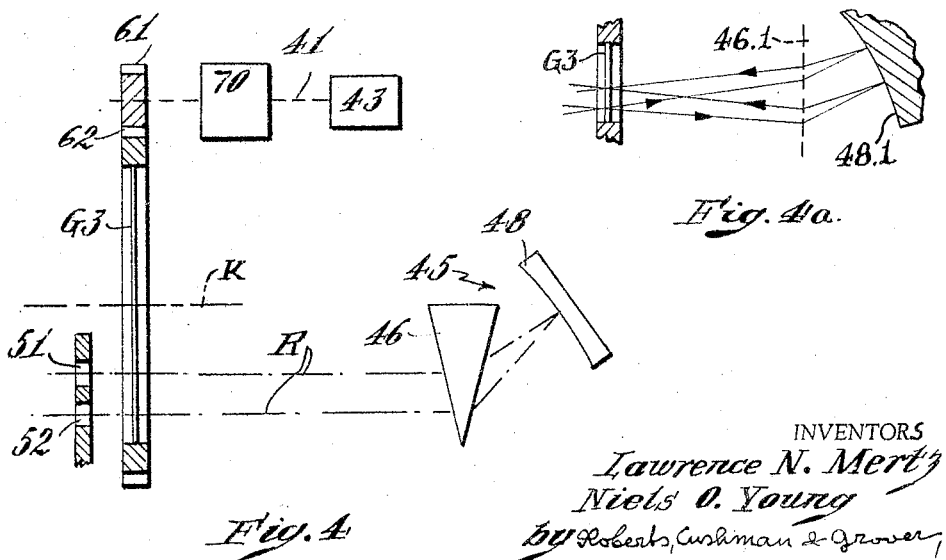
Fig. 4
Fig. 4a
INVENTORS
Lawrence N. Mertz
Niels O. Young
by Roberts, Cushman & Grover
ATT'YS.

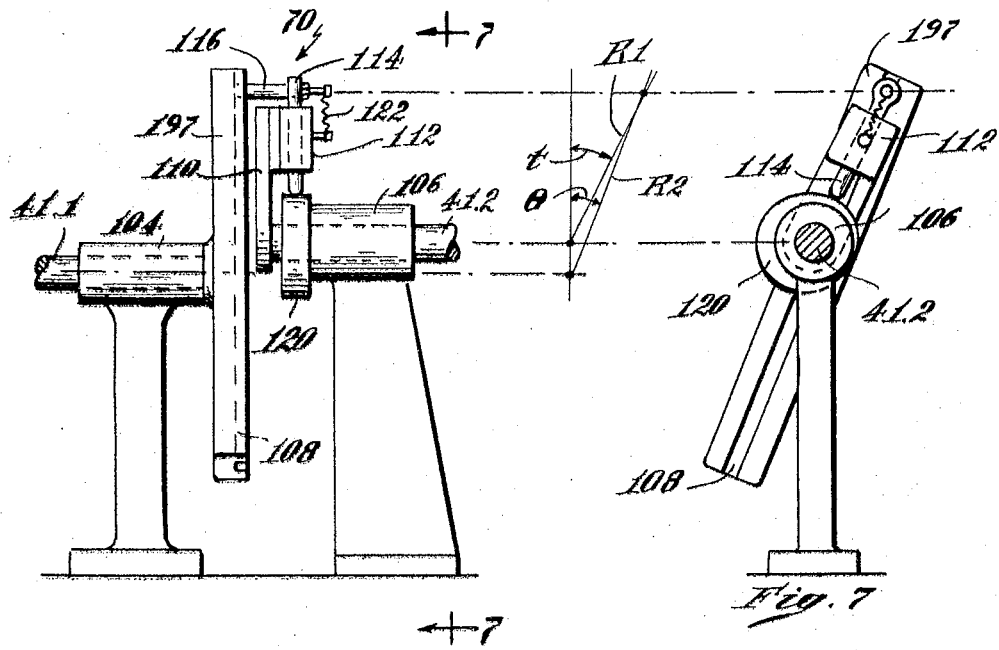
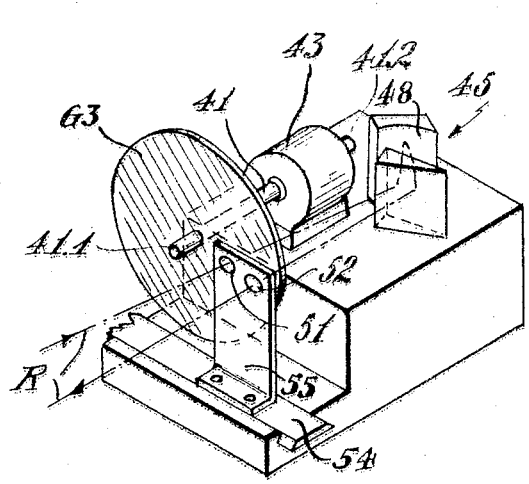
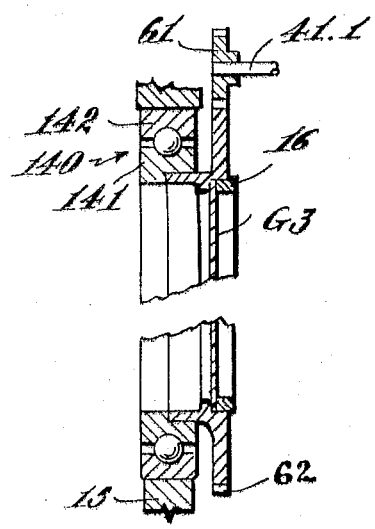

United States Patent Office

3,246,557
Patented Apr. 19, 1966

3,246,557
DISPERSIVE SPECTROMETRIC MODULATION SIMULATING INTERFEROMETRY
Lawrence N. Mertz, Cambridge, and Niels O. Young, South Lincoln, Mass., assignors, by mesne assignments, to Block Engineering, Inc., Cambridge, Mass., a corporation of Delaware
Filed Oct. 24, 1961, Ser. No. 147,319
16 Claims. (Cl. 88—14)

The field of this invention relates to spectrometry and more particularly to obtaining with dispersive spectrometers information in a form similar to that obtainable from interference spectrometers.

Interference spectroscopy possesses several advantages over the more conventional dispersive spectroscopy. Important among these advantages are substantially increased sensitivity and the ability to consider all wavelengths within the same time interval, the output signal being capable of presenting various frequencies in superposition.

The first of these advantages flows from the possibility to avoid light restricting slits and has obviously very important utility in the examination of low intensity light sources.

The second advantage is a result of the form in which information is obtained from an interferometer. This information as obtained directly from an interferometer is not a conventional spectrum but rather a function from which a spectrum can be obtained by analysis. Thus, the transmission function obtained from a Michelson interferometer is the Fourier transform of the spectrum. While this form of output function is not always convenien, it does not bar the use of interferometry in particular spectroscopic applications, but is particularly useful in the examination of sources of unsteady intensity.

A problem which more severely limits spectroscopical uses of interferometry is the typical delicacy of interference apparatus, due to the fact that interference phenomena depend upon very precise spacing of optical surfaces including beam splitters and refractive elements which determine the interfering beams of light. In situations in which shocks and vibration are to be encountered, a true interferometer is practically unusable. Also, the beam splitting and refractive elements reduce the transmission intensity.

Objects of the present invention are accordingly to provide a spectrometric technique including a method, and apparatus for carrying it out, which possesses the advantages of interference spectrometry but which is relatively less delicate in use and much more rugged as to the construction of the apparatus, less dependent on close tolerance setting and operation, and not requiring the use of transmission reducing beam splitting and refractive optics; to provide a spectrometer which yields high resolution and sensitivity comparable to those of an interference spectrometer but which is more simple in operation and adjustment; to provide a dispersion spectrometer which considers all wavelengths simultaneously and permits a relatively simple Fourier analysis of its output; to provide a dispersion spectrometer which furnishes an output signal similar to that of an interference spectrometer but permits free choice of any wavelength to correspond to zero electrical output frequency and permits convenient shifting of the wavelength to output frequency relationship; to provide a spectrometer which operates through rotation rather than translation of the scanning component; and generally speaking to provide spectrometers which are of relatively simple and inexpensive construction and yet precise and certain in operation under very severe environmental conditions.

The substance and nature of the invention can be briefly summarized as to characteristic aspects thereof as follows:

In a principal aspect, the invention contemplates a method of obtaining spectroscopic information in a form similar to that obtained from an interference spectrometer by means of a dispersion spectrometer which comprises the features of subdividing light at an entrance plane of a dispersion spectrometer into an array of slit aperture strips, of focusing the dispered light emerging from the dispersion spectrometer into a multiplicity of displaced images of the entrance slit aperture array upon an exit plane which contains an array of slit aperture strips similar to that at the entrance plane, and of synchronously rotating the entrance and exit slit aperture strip arrays while maintaining the strip array planes imaged on each other. In this manner varying displacements of the dispersed light emerging from the entrance array relative to the exit array produce, upon such rotation, transmission variations which, by controlling the rate and eccentricity of rotation dependent on the dispersion, can be made to resemble the output typical of certain interference spectrometers. In an important practical embodiment of this technique the entrance and exit slit aperture strip arrays are made conjugate by causing images of the entrance slit aperture strip array to be imaged into the same plane as said array, the light having traversed the reflective, dispersive system.

In another important aspect, the invention accomplishes its objects by providing a spectrometer whose transmission characteristics resemble to a controllable degree those of interference spectrometers but which does not depend upon optical interference for its operation; such a spectrometer comprises an image forming optical system including dispersive means, such as a prism, for displacing images formed by the optical system dependent on the wavelength of the image carrying radiation, and arrays of slit aperture means, such as grating means, for masking both entrant, and emerging dispersed, radiation, these slit aperture arrays being imaged on each other and synchronously rotatable.

In a practically especially significant embodiment, the above slit aperture means are represented by a single grating means in the entrant light combined with optical means such as a reflector arranged in the dispersed light emerging from a prism, for imaging the entrant grating upon itself thus optically providing both entrant and emergent slit apertures by way of a single rotatable brating structure.

The rotation of a single, reflected entrant slit aperture structure, or of separate entrant and emergent slit aperture means is controlled, according to another feature of the invention, to conform to a selected non-linear function adapted to render the similarity to an interferometer spectrometer accurate with predictable approximation.

These and other objects, inventive aspects, and advantageous result of the invention will appear from the following outline of it principle and mode of operation together with a detailed description of practical embodiments illustrating its novel characteristics.

The description refers to drawings in which:

FIG. 1 is a diagrammatic plan view of a spectrometer according to the invention, where D shows the direction of dispersion;

FIG. 2 is an elevation of the identical aperture grids of FIG. 1, with the line distances grossly exaggerated;

FIG. 3 is a diagram illustrating the effective spacing of grating lines and their images in the direction D of dispersion;

FIG. 4 is a diagrammatic plan view with the slit array carrier in section, of another, preferred, embodiment of spectrometers according to the invention;

FIG. 4a illustrates an alternative construction of the arrangement according to FIG. 4;

FIG. 5 is an axonometric view of the spectrometer of FIG. 4;

FIG. 6 is a side elevation of a non-linear drive mechanism for incorporation in instruments according to FIGS. 4 and 5;

FIG. 7 is a section on line 7—7 of FIG. 6; and

FIG. 8 is a section similar to FIG. 4 through a hollow bearing support for the aperture grating.

For any given retardation, that is for certain differences in length of interfering light paths, interferometers operate as multichannel filters, passing those wavelengths which are related to each other as harmonics of the path length differences. As pointed out above, data obtained from interferometers can be evaluated for spectroscopic purposes with certain advantages but also drawbacks. In accordance with the present invention many of these drawbacks can be avoided while retaining most advantages.

The invention is based on the recognition that transmission characteristics similar to those of interferometers can be obtained from conventional dispersive spectrometers using prisms or dispersive gratings. This is accomplished by replacing the usual exit slit with an optically effective pattern or mask whose transmittance varies along the direction of dispersion in a manner similar to the way in which the transmission characteristics of an interferometer vary with respect to wavelength. The pattern of such masks is essentially that of parallel bars which are alternatingly opaque and transparent, and of equal width. But, for purposes of the invention, the grating widths are so large as to preclude diffraction phenomena and are effective only as to amplitude rather than direction of wave energy by selective transmission or reflection. Such a mask may be referred to as a slit array. To preclude diffraction phenomena at the slit array its spacing should be such that at least two orders of diffraction from it shall be accepted by the dispersive reflective system which, in a practically important embodiment, images the slit array onto itself. In such a reflective system the return image must be resolved and its space must be larger than geometric aberrations. The method and apparatus serving, according to the invention, so to speak to simulate the output of interference spectrometers without resorting to interference phenomena, will first be explained with regard to the underlying basic principles, by way of step by step comparison with, and deviation in principle from, conventional dispersion spectrometers.

The use of the above-mentioned non-diffractive patterns, masks, or gratings permits the replacement of the conventional single spectroscope entrance slits with an array of entrance slits spaced with a given periodicity. This change does not alter the spectral transmission characteristics of the system but increases by a large factor the total light flow, the entrance slits being imaged on the exit mask just as the entrance slit is imaged on the exit slit in the conventional dispersive spectrometer. Such an arrangement is shown in FIGS. 1 and 2.

Light from the source to be examined is directed by an entrance system such as the lens 11 into a plurality of equally spaced non-diffracting linear entrance slits which together constitute a grating G1. A lens 18 collimates the light from each point on the grating G1 and directs the collimated beam into a prism or conventional dispersive grating $p$ which disperses the light incident upon it in the usual manner. A lens 24, of effectively similar focal length as lens 18 collects the light passed by the prism and, for each wavelength, images the entrance grating G1 onto the plane of an exit grating G2. The spacing of the exit grating G2 is the same as that of the entrance grating G1 and preferably each comprises a series of alternating opaque and transparent linear bands of equal width as shown in FIG. 2. The central ray R and a ray in the dispersed spectrum S are representative of the beams through each transmitting slit of the grating G1 and it will be evident that the slits of the exit grating G2 receive bands of different wavelengths, the intensity for each wavelength varying within a given exit grating slit depending on the composition of the original light coming from the source through the entrance system 11.

As thus far explained however, the modified dispersive spectrometer presents a transmission characteristic resembling that of an interferometer only at one setting or retardation thereof. To obtain a characteristic output which varies as does that of an interferometer with progressively varying retardation, it is necessary similarly to vary the transmission through the gratings G1 and G2. In accordance with the invention, this is accomplished by varying the width or spacing of the slits in the mask or grating in a manner peculiarly suited to resemble the interferometer output. It should be noted however that this variation need take place only in a direction within the plane of dispersion and further that wider spacing in the mask corresponds to smaller differences in length between the interfering light paths in an interferometer.

Further in accordance with the invention, use is made of the possibility of effectively varying the spacing of two parallel lines defining a strip such as a slit aperture, along a given direction merely by rotating the slit, and this principle applies of course also to the transmitting slits of an exit aperture grating G2 as herein used, when rotated in a plane transverse the dispersion bands. This will be evident from FIG. 2, where the oblique spacing of adjacent slit border lines, in the direction of dispersion, is equal to $d = b/\sin \theta$ where $b = d \sin \theta$ is the spacing of adjacent lines in a direction normal thereto and $\theta$ is the angle between the lines and the direction of dispersion D which, it will be noted is parallel to the picture plane of FIGURE 2 or normal to the prism $p$.

To apply such an expedient to a dispersive spectrometer, it is necessary also to rotate the entrance slit or slits correspondingly so as to maintain the spectral resolution of the component dispersive spectrometer and so as, in the case of multiple entrance slits, to maintain the effective spacing of the entrance slits in correspondence with the existing spacing of the slits of the mask grating at the dispersal spectrum. Accordingly, the slit arrays G1 and G2 of FIG. 1 are in conjugate planes and their slits are parallel, essentially identical, and synchronously rotatable.

As the spacing of the grating along the direction of dispersion is changed, the total quantity of light passing through the system will vary in a manner closely similar to the way in which the transmission of an interferometer varies with changing retardation. The transmission of the system when the slits of the slit array lie parallel to the direction of dispersion will be at a maximum if the entrance slits or slit array G1 are exactly imaged onto the slits of the slit array G2. This situation is analogous to the zero retardation transmission of a Michelson interferometer in which zero retardation occurs when the lengths of the interfering light paths are exactly equal and all wavelengths are passed equally.

There is, however, a limit to the extent to which the performance of the described modified dispersive spectrometer can simulate that of an interferometer. A retardatioin limit is set by the relation of the spacing of the grating lines and the dispersive power of the spectrometer, and is reached in the situation in which the slit array rulings are perpendicular to the direction of dispersion. Evidently, no rotational position of the grating will yield a finer spacing in any direction than the transverse spacing of the slit array.

Between this limit and the zero order transmission, the transmission characteristics of the spectrometer according to the invention are similar to those of an interferometer so long as the spacing of the grating in the direction of dispersion is maintained inversely proportional to the retardation of the interferometer. In accordance with the invention, a complete transmission characteristic which is as useful as that of an interference spectrometer can be obtained with an accuracy sufficient for most purposes in the manner now to be explained.

A monochromatic image of the multiple entrance slit structure can be projected onto the exit mask structure by the spectrometer's dispersive optical system. As stated above, both the entrance and exit slit arrays are rotated to vary the effective spacing of the slit array in the direction of dispersion while maintaining the spectral resolution of the spectrometer. It will be apparent that monochromatic images of the entrance slits will coincide with the center of rotation of the exit grating G2 for light of only one wavelength. All other wavelengths will form images whose centers of rotation are displaced from the center of rotation of the exit slit array in the direction of dispersion. Referring to FIG. 3, if P is the stationary center of rotation of the entrance slit array (here assumed to be on an edge of the slit array), if Q is the image of P on the exit grating and hence likewise stationary, and if both slit arrays are parallel as postulated, the reltaive translation $x$ of the slit arrays, is defined by the relation $m = x \sin \theta$. In accordance with the well known geometry of combined transmission situations, the effective transmission as the slit array and its image are rotated about their respective centers P and Q, will be $$T = \frac{1}{2} \cos^2 \left( \frac{\pi}{2} \frac{x \sin \theta}{b} + \phi \right)$$

where $x$ is the distance between P and Q, $b$ is the spacing of the slit arrays as in FIG. 2, $\theta$ is the orientation of the slit arrays relatively to D, and $\phi$ is a constant.

It will now be evident that the output signal of the present spectrometer is similar to that of an interference spectrometer, namely a modulation or chopping of the various wavelengths, the path length difference being varied continuously with time. The rotating aperture slits of the system according to the invention also have a chopping effect as above set forth.

For the purpose of further evaluating the above transmission equation for purposes of the invention, it can be rewritten by means of the relation $d = b / \sin \theta$ given above with reference to FIG. 2 for the spacing of the aperture slits or grating lines, as follows:

$$T = \frac{1}{2} \cos^2 \left( \frac{\pi}{2} \frac{x}{d} + \phi \right)$$

Since $x$ is dependent upon the dispersion of the spectrometer, the general equation for the transmission of the modified spectrometer, assuming linear dispersion, becomes $$T = \frac{1}{2} \cos^2 \left[ \frac{\pi}{2} \frac{k(\lambda - \lambda_0)}{d} + \phi \right]$$

where $k$ is a constant representing the dispersive power of the spectrometer optical system, $\lambda$ is the wavelength of the incident light and $\lambda_0$ is the wavelength for which the center of rotation of the image of the entrance slits is coincident with the center of rotation of the exit grating. For $\lambda_0 = 0$ and $\phi = 0$ this equation is identical with that for the transmission of a Michelson interferometer at retardation $k/d$. The significance of the constant $\phi$ remains to be explained, as follows. Considering the superposed object and image gratings as shown in FIG. 3 but with $\theta$ zero, the following relations will prevail. If centers P, Q lie on grating edges such that transmitting bright lines of the image of G1 coincide with opaque lines of G2, the transmission T will be zero and hence $\phi = \pi/2$ to satisfy the formula with $\theta$ zero.

On the other hand, again with $\theta$ equal to zero, if the centers of rotation lie on the slit array line centers, transparent image lines will coincide with transparent object slit array lines, with $T = \frac{1}{2}$ and hence $\phi$ zero. In this manner, $\phi$ is established directly as a constant dependent solely upon the position of the center of rotation P on the object or entrance slit array. In this context it should be noted that it is not necessary that the centers of rotation actually lie within the field of the instrument.

It should be noted that the measuring technique according to the invention does not depend upon the linearity of dispersion which was assumed in deriving the above formula for the transmission by using $x = k(\lambda - \lambda_0)$. The effect of the slit arrays is to cause the transmission characteristic to behave as the Fourier transform of the distribution of energy among the various displacements caused by the dispersive element. If the dispersion is non-linear, the only effect is that the spectrum, obtained by taking the inverse Fourier transform of the transmission function, must be corrected in the same manner as the spectrum obtained from any prism spectrometer.

As indicated previously the range over which the dispersive spectrometer according to the invention is equivalent to the transmission characteristic of an interference spectrometer is limited in that the value $x$ cannot be made smaller than the transverse spacing of the slit array. This limitation of range acts as a limitation on the resolution of the present interferometer when its light transmission function is analyzed. This effect can be minimized by decreasing the spacing of the slit array. For best spectral resolution this spacing is made as small as the imaging optical system will resolve and in this case the instrument can equal in resolution the dispersive spectrometer upon which it is based.

The spectrometer according to the invention has however a distinct resolution advantage over the interference spectrometer in one aspect. The interferometer must measure absolute wavelength. This leads to the requirement that $\lambda_0 = \lambda$. The present spectrometer, on the other hand, has a transmission characteristic which is based on the variable $(\lambda - \lambda_0)$. $\lambda_0$ can be selected at will by suitably positioning the center of rotation of the exit slit array relative to the chromatically dispersed images of the entrance slits.

The possibility of choosing $\lambda_0$ in this manner is analogous to heterodyning the wavelengths of the input energy so that the difference in chopping frequency between relatively similar wavelengths is accentuated. This possibility markedly improves the resolution of the simulated interferometer by permitting a relative short Fourier analysis to identify the energies within a small range of wavelengths. This feature is, in fact, believed to be one of the greatest advantages of the present invention.

The proper operation of the dispersive spectrometer upon which the present novel interferometer is based necessarily requires, as stated previously, synchronous rotation of entrance and exit slit arrays. The degree of precision to which the respective rotations must be matched depends of course on the slit array spacing and since fine spacing is desired the requirement for precision is a stringent one. A practical embodiment which inherently provides optimal precision is therefore preferred. This embodiment will now be described with reference to FIGS. 4 and 5.

In the construction according to FIG. 4 a single slit array G3 rotatable on axis K (corresponding to R of FIG. 1) defines both the entrance and exit slit arrays and a dispersive spectrometer system 45 of the well-known Littrow type images the grating on itself. In a fully operative instrument, a slit array of the well-known Ronchi type with 1500 lines per inch is found to be wholly satisfactory. The slit array or Ronchi grating of 1500 lines per inch gives diffraction directions separated about 12° at visible wavelengths. Thus the optical systems which images this Ronchi onto itself should accept an angular divergence of at least 24° in the bundles of rays from the Ronchi. In other words, a 24° acceptance angle assures that the fundamental space frequency of the Ronchi will be reproduced in its image. The Littrow spectrometer system 45 has a prism or dispersive grating 46 and a cylindrical mirror 48 so arranged that light from the entrance pupil 51 is dispersed by the prism 46 and imaged back into the exit pupil 52 by the mirror 48. The system then operates in essentially the same manner as the device according to FIG. 1, with central rays R. The possibility of conventional adjustments is indicated by the slide mounting 54 of the aperture board 55 in FIG. 5.

FIG. 4a illustrates an alternative embodiment wherein the prism 46 and the mirror 48 are replaced by a diffraction grating 46.1 and a curved mirror 48.1.

FIG. 5 indicates the above described components and shows the Ronchi grating G3 mounted on the shaft 41 of a motor 43. FIG. 4 indicates schematically a ring bearing support for arrays similar in principle to those shown in FIG. 1. The shaft 41 of the motor 43 carries in this instance a pinion 61 driving the toothed rim 62 of the grating. Between the motor and the grid can be inserted a motion 70 for rotating the grid according to a predetermined non-linear function. These drive modifications will be further explained with references to FIGS. 6 to 8.

The center of rotation of the exit grating is obviously fixed but the center of rotation of the images coming from the entrance pupil can be located relative to the exit pupil at will by canting the mirror 48 (FIGS. 4, 5) around an appropriate axis. This will shift the center of rotation of the images in the direction of dispersion to any desired degree, or conversely, the particular range of colors desired can be directed into the exit pupil thereby obtaining the increased resolution and free choice of $\lambda_0$, above as an advantage of the present invention.

As indicated throughout the description this far, the operation of the present dispersive spectrometer, intended to furnish an output resembling that of interference spectrometers, depends upon the spacing of the grating in the direction of dispersion in the dispersive interferometer being varied inversely to the retardation characteristic of an interferometer. Typically, it is desired that readings be taken as a time function which may be conveniently recorded, as for example, on magnetic tape. If the output function is to be analyzed by a straight forward Fourier transformation, the chopping frequency for each wavelength must remain constant over the entire range of adjustment. In an instrument according to the invention, such constant chopping frequency can be obtained by controlling the rotation of the grating G3. Rewriting the formula for the transmission of the present spectrometer in terms of the rotation of the grating yields, with $d = b/\sin\theta$ as above, $$T = \frac{1}{2} \cos^2 \left[ \frac{\pi}{2} \frac{k(\lambda - \lambda_0)}{s} \sin\theta + \phi \right]$$

The requirement of constant chopping frequency for each wavelength thus imposes the condition that $\sin\theta$ should be varied linearly with respect to time or, conversely, it means that the rotation of the grating should be non-linear. If incremental movement is permissible, an escapement operating on non-uniformly spaced indentations on the periphery of the grating G can be used.

A continuous motion, better adapted to rapid scanning, can be obtained from a drive mechanism based upon a conventional crank and slot drive in which the axes of the crank and slot are offset. A reasonably good approximation of the desired motion over a portion of a cycle can be obtained by driving the crank with the slot, with the offset between their respective axes being equal to about one-half the crank radius.

A very accurate drive can be obtained by means of a cam for correctively modifying the crank length as needed to obtain a linearly varying $\sin\theta$. Such a drive is shown in FIGS. 6 and 7. A drive shaft 41.1 and a driven shaft 41.2 are journaled in bearings 104 and 106 respectively. Attached to the end of the drive shaft 41.1 is a bar 197 which is slotted along its entire length as at 108. On the end of the driven shaft 41.2 is a crank 110 having a linear journal 112 for a sliding crank extension 114. The crank extension carries a pin 116 which slides in the slot 108. A cam 120 is mounted on the end of the bearing 106 in line with the crank extension member 114. The crank extension member 114 is rounded at its inner end or otherwise constructed so as to function efficiently as a cam follower, and is held in engagement with the cam 120 by the spring 122.

The table below indicates with references to FIGS. and 7 appropriate total crank lengths for various angular positions of the driving slot and also the corresponding angular positions of slot and crank.

| t-Position of Slot | θ-Position of Crank | R1-Length of Crank | R2-Length of Crank |
|---|---|---|---|
| 0 | 0 | | |
| 10 | 3.8 | .617 | 1.61 |
| 20 | 7.7 | .626 | 1.605 |
| 30 | 11.5 | .631 | 1.575 |
| 40 | 15.5 | .645 | 1.550 |
| 50 | 19.5 | .656 | 1.510 |
| 60 | 23.6 | .675 | 1.46 |
| 70 | 27.8 | .696 | 1.395 |
| 80 | 32.2 | .719 | 1.33 |
| 90 | 36.9 | .754 | 1.25 |
| 100 | 41.8 | .785 | 1.16 |
| 110 | 47.2 | .824 | 1.056 |
| 120 | 53.1 | .870 | .943 |
| 130 | 60.1 | .923 | .816 |
| 140 | 69.0 | .987 | .680 |
| 150 | 90 | 1.154 | .578 |
| 160 | | | |
| 170 | | | |
| 180 | | | |

Motions according to FIGS. 6 and 7, with or without cam correction, can be driven from either slot or crank, the motor being connected to either shaft 41.1 or 41.2, respectively. It will be understood that, if $t$ is the driving shaft angle, then $t$ is a linear function of time and $\sin\theta$ constrained to a linear function of time. The critical parameter is the duty cycle since a certain time must be allowed for the return part of the saw tooth curve characteristic of the cycle of recordation of the output of the instrument. Using a correction of this character it is possible to achieve a duty cycle of ⅚, the output of the instrument being suitable blanked during the remaining ⅙ of each cycle.

It will be understood that the angle $\theta$ indicated in FIGS. 6 and 7 is the rotatory displacement of the slit aperture array if shaft 41.1 directly drives the grating G3 of FIG. 5, or is proportionate to that rotation if shaft 41.1 drives the pinion 61 described with reference to FIG. 4. It will be understood that the motion according to FIGS. 6 and 7 is schematically indicated at 70 of FIG. 4 and can be similarly inserted in the shaft 41 of FIG. 5.

FIG. 8 illustrates a practical embodiment of a hollow bearing support for the grating, as indicated in FIGS. 2 and 4. In this Figure, 15 denotes a bearing housing suitably fastened to a base such as schematically also indicate at 15 of FIG. 2. The grating ring 16 is fastened to the inner race 141 of a ball bearing 140 whose outer race 142 is fixed to the housing 15. The pinion 61, mentioned with reference to FIG. 4, is shown as fastened to the shaft 41 (FIGS. 4, 5) of the motor, or to shaft 41.1 or 41.2 if a motion 70 according to FIGS. 6 and 7 is used, driving toothed rim 62.

While particular instruments have been described for purposes of illustration, it should be understood that the principles involved may be applied to yield information similar to that obtainable by way of interferometry in any energy region where dispersive elements are available and accordingly that the present invention includes all modifications and equivalents falling within the scope of the appended claims. Furthermore, while the above referred to similarity often amounts to actual simulation of the mode of operation of interferometers—and is herein sometimes so referred to for the didactical purpose of simplified explanation—it should be understood that the usefulness of the invention is in no way limited to such simulation of known apparatus but rests on its inherent novel characteristics which, as will be apparent from the present description, permit its application to problems which do not depend on, arise from, or require, simulation of known techniques.

It should be understood that the present disclosure is for the purpose of illustration only and that this invention includes all modifications and equivalents which fall within the scope of the appended claims.

We claim:

1. A method of obtaining spectroscopic information in a form similar to that obtained from an interference spectrometer by means of a dispersion spectrometer, which comprises:
    subdividing light at an entrance plane of a dispersion spectrometer into an array of strips;
    focusing the dispersed light emerging from the dispersion spectrometer into a multiplicity of displaced images of said entrance slit aperture array upon an exit plane which contains an array of strips similar to that at said entrance plane; and
    synchronously rotating the entrance and exit slit aperture strip arrays while maintaining the planes of said strip arrays imaged on each other;
    whereby varying displacements of the dispersed light emerging from the entrant slit array relative to the emergent slit array, upon such rotation, produce transmission variations which, by controlling the rate and eccentricity of rotation dependent on the dispersion, can be caused to simulate an interference spectrometer output, different rotational positions of the aperture strips corresponding to different retardation settings of an interference spectrometer.

2. Method according to claim 1 wherein entrance and exit slit aperture strip arrays are obtained by reflecting a single strip array upon itself such that said single strip array is self-conjugate by imagery in a dispersive, reflective system.

3. A dispersive spectrometer modulator simulating an interferometer comprising:
    a dispersive spectrometer;
    an aperture array means of linear parallel slits for masking the radiation entering into and emerging from said spectrometer; and
    means for rotating said array.

4. A spectrometer comprising:
    an image forming optical system including dispersive means for displacing images formed by said system to a degree dependent upon the wavelength of the image carrying radiation; and
    an aperture array of linear parallel slits for masking both ingoing and outgoing dispersed radiation, said array being synchronously rotatable.

5. A spectrometer according to claim 4 wherein said dispersive means includes prism means.

6. A spectrometer according to claim 4 wherein said dispersive means includes dispersive grating means.

7. A spectrometer comprising:
    an image forming optical system including dispersive means for displacing images formed by said system to a degree dependent upon the wavelength of the image forming radiation;
    a first aperture array of linear parallel slits in front of said dispersive means;
    a second array similar to said first array, in the dispersed light emerging from said dispersive means, said arrays being oriented with respect to said optical system so that said first array is imaged onto said second array; and
    means for rotating each of said arrays in its own plane.

8. A spectrometer comprising:
    an aperture array of linear parallel slits;
    an image forming optical system for imaging said array substantially onto itself, said optical system including dispersive means for displacing images formed by said system to a degree dependent upon the wavelength of the image forming radiation; and
    means for rotating said array.

9. A spectrometer according to claim 8, further comprising:
    a deflecting means for adjusting the position of the center of rotation of the image of the array relative to the array.

10. A spectrometer according to claim 8, wherein said array comprises alternating opaque and transparent strips of equal width.

11. A spectrometer according to claim 10, wherein the width of said strips is approximately equal to the limit of resolution of said optical system.

12. A spectrometer comprising:
    optical grating means having alternating, equally spaced opaque and transparent strips;
    a mount for said grating means for rotating it in its own plane;
    dispersive means facing said grating means; and
    concave reflector means behind said dispersive means with respect to said grating means, for imaging the grating means onto itself;
    whereby the energy distribution of incident light can be determined from the relation of the transmission of the spectrometer to the angular position of the grating means.

13. A spectrometer comprising:
    an image forming optical system including dispersive means for displacing an image formed by said system to a degree dependent upon the wavelength of the image carrying radiation;
    optical grating means having alternatingly opaque and transparent strips of equal width; and
    means for rotating said grating means such that the sine of the angle between said strips and the direction of dispersion of said optical system varies linearly with time over a substantial portion of the rotation of said grating means.

14. A spectrometer comprising:
    optical grating means having alternatingly opaque and transparent strips of substantially equal width;
    an image forming optical system for imaging said grating means substantially onto itself, said optical system including dispersive means for displacing images formed by said system to a degree dependent upon the wavelength of the image forming radiation; and
    means for rotating said grating such that the sine of the angle between said strips and the direction of dispersion of said optical system varies linearly with time over a substantial portion of the rotation of said grating means.

15. A spectrometer according to claim 12 wherein said means for rotating said grating includes a crank and slot rotary drive motion.

16. A method of obtaining spectroscopic information which comprises:
    dividing radiation within a given wavelength range with aperture means at the entrance and exit sides of a dispersion spectrometer, at least one of said aperture means being an array of slits which are non-diffractive within said range such that each exit aperture receives dispersed radiation of differing wavelengths with the intensity of each wavelength within a given exit aperture depending on the composition of the entering radiation;

imaging said entrance and exit aperture means, respectively, upon conjugate planes; and varying the transmission through the apertures by rotating the entrance and exit aperture means such that their components of angular velocity are harmonically related while maintaining them conjugate and parallel to each other;

whereby the emerging radiation contains, depending on the rate of transmission variation, the intensities of the various entrant radiation wavelengths transformed into signals of various frequencies which are susceptible to analysis for producing a spectrum of the original radiation intensities.

References Cited by the Examiner

UNITED STATES PATENTS

| | | | |
|---|---|---|---|
| 2,867,148 | 1/1959 | Svensson | 88—14 |
| 3,045,531 | 7/1962 | Prescott | 88—14 |
| 3,145,252 | 8/1964 | Herriott | 88—14 |

FOREIGN PATENTS 782,831   9/1957   Great Britain.

OTHER REFERENCES

Diffraction Gratings as Measuring Scales (J. Guild), published by Oxford University Press (London), 1960, pages 3, 4 and 11 relied on.

Rotating Two Dimensionally Patterned Gratings (M. Golay), Journal of the Optical Society of America, (vol. 38, No. 12, p. 1099, Abstract No. 34), (December 1948).

Girard: "Nouveaux Dispositifs de Spectroscopie a Grande Luminosite," Optica Acta, vol. 7, No. 1, January 1960, pp. 81–97.

National Physical Society Symposium No. 11, Interferometry, published by Her Majesty's Stationery Office (London), December 14, 1960, pages 416, 420 and 421 relied on.

The Interference Systems of Crossed Diffraction Gratings: Theory of Moire Fringes (J. Guild), published by Oxford University Press (London), 1956, pages 4 and 5.

JEWELL H. PEDERSEN, *Primary Examiner.*